United States Patent [19]

Hagemeister

[11] Patent Number: 4,684,111
[45] Date of Patent: Aug. 4, 1987

[54] BENT WIRE SPRING MODULE

[75] Inventor: Robert C. Hagemeister, Boston, Mass.

[73] Assignee: Webster Spring Co. Inc., Oxford, Mass.

[21] Appl. No.: 829,489

[22] Filed: Feb. 14, 1986

[51] Int. Cl.4 ............................................. F16F 1/12
[52] U.S. Cl. .................................... 267/103; 5/247; 267/110
[58] Field of Search .................... 267/80, 85, 87, 103, 267/104, 105, 106, 107, 108, 109, 110, 111, 112, 165; 5/247, 255, 476, 267

[56] References Cited

U.S. PATENT DOCUMENTS

| 386,846 | 7/1888 | Powers | 5/267 |
|---|---|---|---|
| 2,843,191 | 7/1958 | Regan | 267/80 |
| 3,487,480 | 1/1970 | Slominski | 5/247 |
| 3,761,972 | 10/1973 | Bihun et al. | 5/247 |
| 4,577,841 | 3/1986 | Hagemeister | 267/103 |
| 4,595,180 | 6/1986 | Hagemeister | 5/255 X |

Primary Examiner—Duane A. Reger
Attorney, Agent, or Firm—Robert T. Gammons

[57] ABSTRACT

A spring module for use in a spring assembly embodying a base frame and a grid frame comprising lower and upper attaching elements for connecting the module to the base frame and grid frame and a plurality of lower and upper symmetrically-disposed, legs yieldable in bending connecting the lower and upper attaching elements.

3 Claims, 6 Drawing Figures

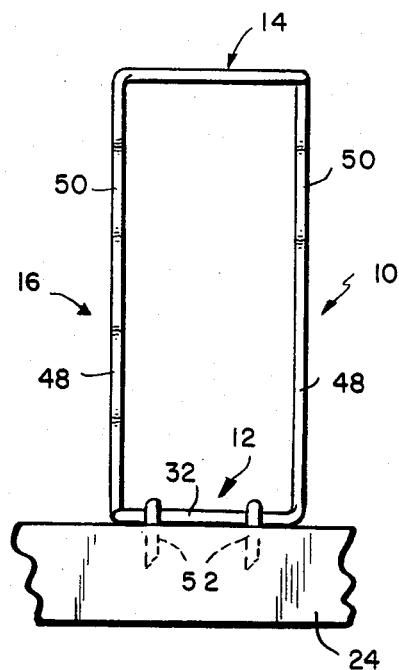
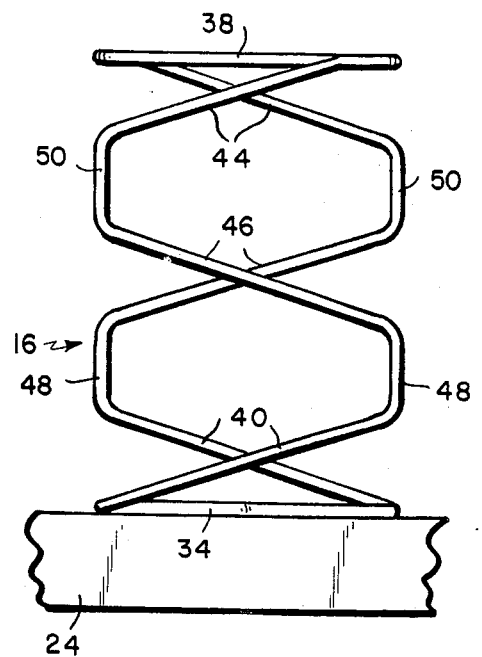
FIG.1  FIG.2
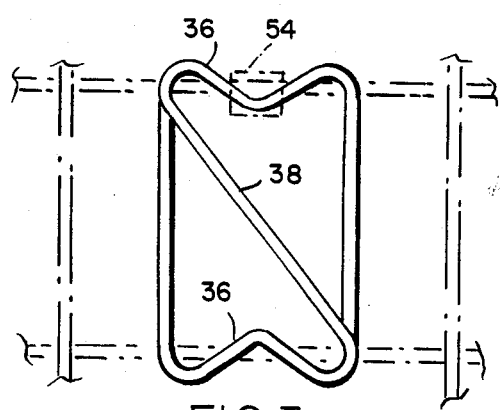
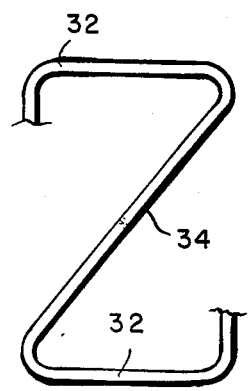
FIG.3  FIG.4
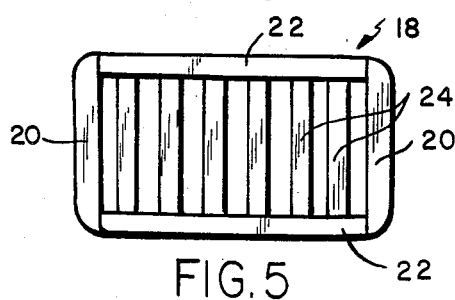
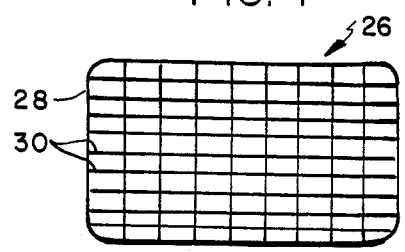
FIG.5  FIG.6

BENT WIRE SPRING MODULE

BACKGROUND OF THE INVENTION

Bent wire spring modules of various configuration are disclosed in my pending applications for patent which variously provide for soft and stiff yield, for economy in use of wire, and for ease of manufacture. It is the purpose of this invention to provide modules of novel structural composition designed to afford the aforesaid advantages in a differently configured combination of supporting arms. More specifically, the structured module is designed to afford yield by bending of the arms relative to each other.

SUMMARY OF THE INVENTION

As herein illustrated, the spring module comprises lower and upper attaching elements by means of which the module can be attached, respectively, to a base frame and a grid frame and means yieldably connecting the lower and upper attaching elements comprising first transversely-spaced, parallel, oppositely-inclined, upwardly-extending legs, second transversely-spaced, parallel, oppositely-inclined, downwardly-extending legs, third transversely-spaced, parallel, oppositely-inclined legs inclined in opposite directions from the first and second legs and fourth legs connecting the first legs to the third legs and second legs to the third legs. The first, second and third legs are of substantially the same length and the fourth legs are disposed in spaced, parallel relation and substantially vertical. The attacing elements comprise spaced, parallel lengths of wire joined by diagonals, the diagonals extending in opposite directions. The fourth legs are of the same length and spaced transversely in the plane of the legs and are parallel.

The invention will now be described with reference to the accompanying drawings, wherein:

FIG. 1 is a front elevation of the spring module;
FIG. 2 is a side elevation of the spring module;
FIG. 3 is a top view of the spring module;
FIG. 4 is a bottom view of the spring module.
FIG. 5 is a plan view of a base frame to which the lower ends of the spring units are attached; and
FIG. 6 is a plan view of a grid frame to which the upper end of the spring unit are attached.

Referring to the drawings, FIGS. 1 to 4, the spring module 10 is comprised of lower and upper attaching elements 12 and 14 and intermediate the attaching elements, a plurality of yieldable leg members 16. The spring units 10 are attached at their lower and upper ends to a base frame 18, FIG. 5, comprised of spaced, parallel ends 20—20, spaced, parallel sides 22—22 and crossbars 24 and a grid frame 26, FIG. 6, of rectangular configuration comprised of a rectangular border wire 28 and longitudinally and transversely-crossing wires 30 welded at their crossings. The lower ends of the modules 10 are attached to the crossbars 24 of the base frame and the upper ends are attached to the grid wires 30.

As illustrated, FIG. 4, the lower attaching element 12 comprises spaced, parallel lengths of wire 32—32 connected by a diagonal 34 and the upper attaching element, FIG. 3, comprises of spaced, parallel lengths of wire 36—36 connected by a diagonal 38.

The intervening leg members 16 comprise spaced, parallel legs 40—40 connected at their lower ends to the wires 32—32 which extend in opposite directions upwardly therefrom in spaced, parallel relation to each other, upper legs 44—44 connected at their upper ends to the wires 36—36 and which extend downwardly therefrom in opposite directions in spaced, parallel relation to each other and third legs 46—46 disposed in spaced, parallel relation and inclined in opposite direction. The third legs 46—46 are connected at their lower ends to the upper ends of the first legs 40—40 by vertical lengths of wire 48—48 and at their upper ends to the lower ends of the second legs 44—44 by vertical lengths of wire 50—50. The lengths of wire 48—48 and 50—50 are parallel in both longitudinal and transverse directions of the module. Furthermore, the lower, upper and intermediate lengths of wire are of equal length and the vertical lengths of wire are of equal length.

The modules are attached to the base frame by means of staples 52 and to the grid by means of clips 54.

It should by understood that the present disclosure is for the purpose of illustration only and includes all modifications or improvements which fall within the scope of the appended claims.

What is claimed is:

1. A spring module comprising lower and upper attaching elements by means of which the module can be attached, respectively, to a base frame and a grid frame and means yieldably connecting the lower and upper attaching elements comprising in transversely-spaced, parallel, vertical planes, first oppositely-inclined, upwardly-extending legs, second oppositely-inclined, downwardly-extending legs, said first legs being connected to the lower attaching element, said second legs being connected to the upper attaching element, third oppositely-inclined legs inclined in opposite directions from the first and second legs, and fourth vertically-disposed legs connecting the first legs to the third legs and the second legs to the third legs.

2. A spring module according to claim 1 wherein the first, second and third legs are substantially the same length.

3. A spring module according to claim 1 wherein the fourth legs are substantially the same length..

* * * * *